W. H. THIEMER.
UNIVERSAL JOINT.
APPLICATION FILED JUNE 19, 1919.
1,336,985.
Patented Apr. 13, 1920.
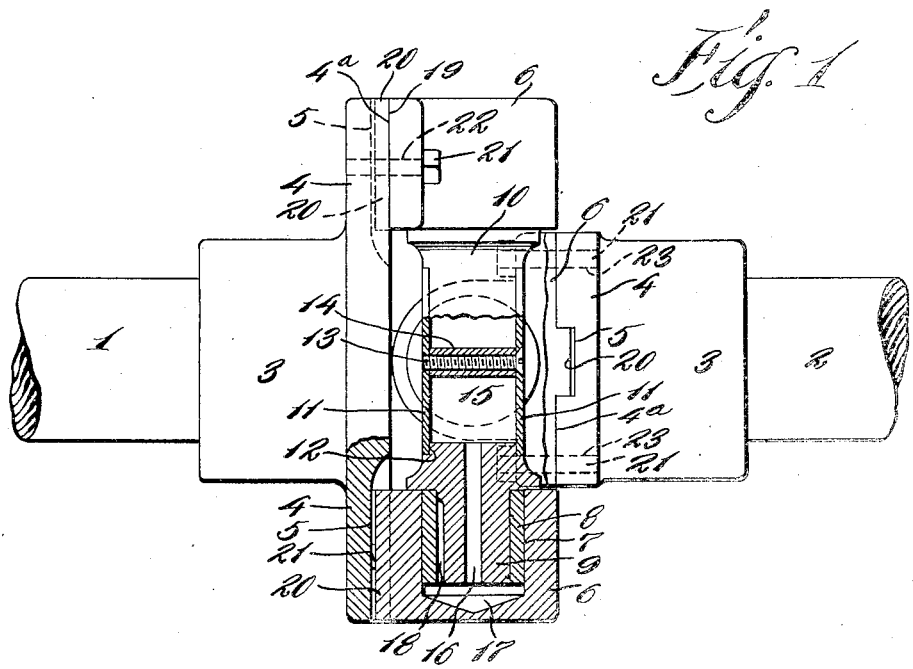
Fig. 1
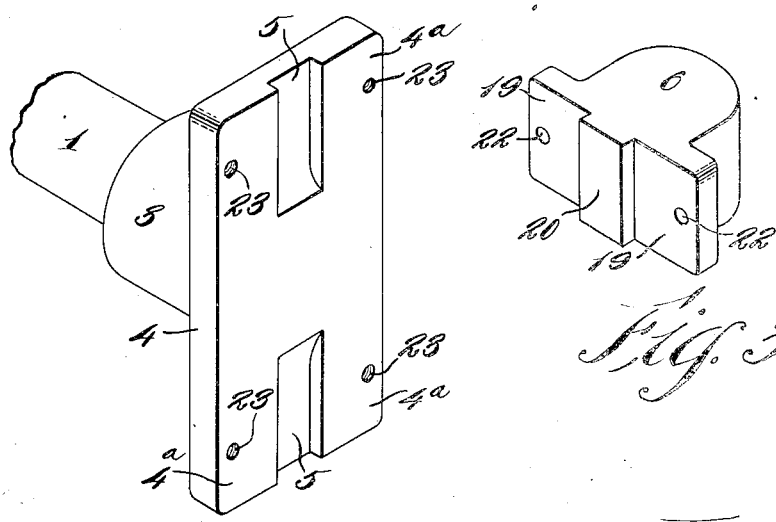
Fig. 2
Fig. 3
Inventor
William H. Thiemer
By Hull, Smith, Brock & West
Attys.

UNITED STATES PATENT OFFICE.

WILLIAM H. THIEMER, OF CLEVELAND, OHIO, ASSIGNOR TO THE PETERS MACHINE AND MANUFACTURING COMPANY, OF CLEVELAND, OHIO, A CORPORATION OF OHIO.

UNIVERSAL JOINT.

1,336,985.  Specification of Letters Patent.  Patented Apr. 13, 1920.

Application filed June 19, 1919. Serial No. 305,331.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints, and has for its general object to provide a joint of this character which may be conveniently assembled and disassembled and which is economical of production, simple in construction, and efficient in operation.

In the drawings forming part hereof, Figure 1 represents a sectional side elevation of a universal joint constructed in accordance with my invention, together with the coöperating shaft sections united thereby; Fig. 2 a detail in perspective of the supporting base or flange for the bearing blocks; and Fig. 3 a similar view of the said blocks.

Describing the various parts by reference characters, 1 and 2 denote the ends of shaft sections, each being shown as provided with a hub 3 having a base flange 4 projecting therefrom. Each base flange is provided with a flat or plane seat $4^a$ at each end thereof and with a recess 5 projecting inwardly from each end thereof and into such seat; each recess being preferably rectangular in section throughout the major portion of its length. Coöperating with each seat is a bearing block, indicated generally at 6. Each block is shown as provided with a bore 7 extending outwardly from the inner face thereof and terminating within the outer face. Each bore is adapted to receive a bushing 8 surrounding a trunnion 9 on the connecting member 10. The connecting member may be of the ring type and provided with cover plates 11 fitted within annular recesses 12 on each side of the inner surface of said ring, the plates being shown as connected by a bolt 13 mounted within a spacing sleeve 14, the said plates and the interior of the ring forming a central chamber 15 for lubricant. Lubricant from this chamber will be distributed by centrifugal action through a radial port 16 in each trunnion to the well 17 provided beyond each trunnion within its bearing block and thence between each trunnion and its bushing, as by means of a port 18 which may be formed as a groove in the outer surface of each trunnion.

Each bearing block is provided with a flat base 19 adapted to rest upon a flat seat $4^a$ and with a central key projection 20 (preferably rectangular in cross section) and adapted to enter a groove or recess 5. Each key projection is of less depth than its corresponding groove or recess 5 but is of the same width as said recess, whereby the sides of the key projection will engage the side walls of their respective grooves or recesses with the surfaces 19 of the bearing blocks engaging the seats $4^a$ of the base flanges. The bearing blocks are secured to the base flanges, as by means of bolts 21 extending through apertures 22 on opposite sides of the bases of the bearing blocks and threaded into apertures 23 in said base flange on each side of the seats $4^a$.

By the construction shown and described, the intermediate or connecting member 10 may be conveniently secured to the hub flanges, the key projections 20 forming driving connections between both shaft sections. The clearance provided between the bases of the key projections and the bottoms of the recesses 5 prevent any binding between the bottoms of the projections and the recesses and insure a close engagement between the bases of the bearing blocks and the seats $4^a$.

Having thus described my invention, what I claim is:—

1. In a universal joint, the combination of a hub having a base flange provided with a seat having a recess projecting into the same from one end thereof, a bearing block having a projection adapted to enter said recess, and means for securing said block to said seat.

2. In a universal joint, the combination of a hub having a base flange, said flange having a seat provided with a recess substantially rectangular in cross section extending inwardly from one end thereof, a bearing block having a key projection extending therefrom, the said projection being substantially rectangular in section, and means for securing said block to said seat.

3. In a universal joint, the combination of a hub having a base flange, said flange having seats at opposite ends thereof, each seat having a recess extending inwardly from the adjacent end of said flange, the said recess being substantially rectangular in section, and a bearing block for each seat having a face adapted to coöperate with such seat and provided with a key projection substantially rectangular in section adapted to be received within the recess of such seat, the said projections being of less depth than the said recesses, and means for securing said blocks to their respective seats.

4. In a universal joint, the combination of a hub having a base flange, said flange having a seat provided with a recess extending inwardly from the adjacent end of said flange, the said recess being substantially rectangular in section, and a bearing block having a face adapted to coöperate with said seat and provided with a key projection substantially rectangular in section adapted to be received within the recess of such seat, the said projection being of less depth than the said recess, and means for securing said block to said seat.

In testimony whereof I hereunto affix my signature.

WILLIAM H. THIEMER.